United States Patent [19]

Linden

[11] Patent Number: 4,934,515
[45] Date of Patent: Jun. 19, 1990

[54] ENDLESS ACCUMULATING CONVEYOR

[75] Inventor: Roy C. Linden, Birmingham, Mich.

[73] Assignee: Litton Industrial Automation Systems, Inc., Florence, Ky.

[21] Appl. No.: 232,782

[22] Filed: Aug. 16, 1988

[51] Int. Cl.⁵ .............................................. B65G 17/00
[52] U.S. Cl. ................................ 198/803.2; 198/465.3
[58] Field of Search ............... 198/465.3, 803.2, 465.1, 198/803.01, 465.4

[56] References Cited

U.S. PATENT DOCUMENTS

| | | | |
|---|---|---|---|
| 3,934,701 | 1/1976 | Mooney et al. | 198/465.1 |
| 3,949,859 | 4/1976 | Nussbaumer et al. | 198/803.2 |
| 4,088,220 | 5/1978 | Jacksch et al. | 198/803.2 |
| 4,201,286 | 5/1980 | Meier | 198/465.4 |
| 4,442,935 | 4/1984 | Gregg | 198/803.01 |
| 4,751,998 | 6/1988 | Yano | 198/465.1 |
| 4,776,453 | 10/1988 | Miller | 198/803.2 |

FOREIGN PATENT DOCUMENTS

| | | | |
|---|---|---|---|
| 48125 | 4/1980 | Japan | 198/465.3 |
| 956241 | 9/1982 | U.S.S.R. | 198/803.2 |

Primary Examiner—Joseph E. Valenza
Attorney, Agent, or Firm—Barnes, Kisselle, Raisch, Choate, Whittemore & Hulbert

[57] ABSTRACT

An endless accumulating conveyor of the under/over type adapted to slidably support pallets and to frictionally transport them over both the upper and lower conveyor runs. The pallets may be held stationary and accumulated while the conveyor continues to advance. If the pallets are allowed to advance, without accumulating, they will be positively propelled around the curved section at each end of the conveyor from one run to the other by a drive mechanism which is adapted to engage a part on each pallet.

6 Claims, 5 Drawing Sheets

ENDLESS ACCUMULATING CONVEYOR

This invention relates generally to conveyors and refers more particularly to endless accumulating conveyors of the under/over type.

SUMMARY OF THE INVENTION

An endless accumulating conveyor of the under/over type has upper and lower runs and is adapted to slidably support pallets and to frictionally transport them over both the upper and lower runs.

In accordance with this invention, a drive mechanism is provided for positively advancing the pallets from one run to the other, over the curved section at one end or both ends of the conveyor. Such drive mechanism comprises a driven member having propelling means movable along the path of the pallets as the pallets move over the curved section. A part on each pallet is engageable with the propelling means. As one example, the propelling means may be a series of spaced apart teeth and the part on the pallet may be a dog or pin.

The conveyor of this invention represents a major cost savings in that it eliminates the pallet return drive system along with the elevator and lowerator at each end of the conveyor, which is required for a conventional under/over conveyor.

These and other objects of the invention will become more apparent as the following description proceeds, especially when considered with the accompanying drawings.

DETAILED DESCRIPTION

Figure 1:
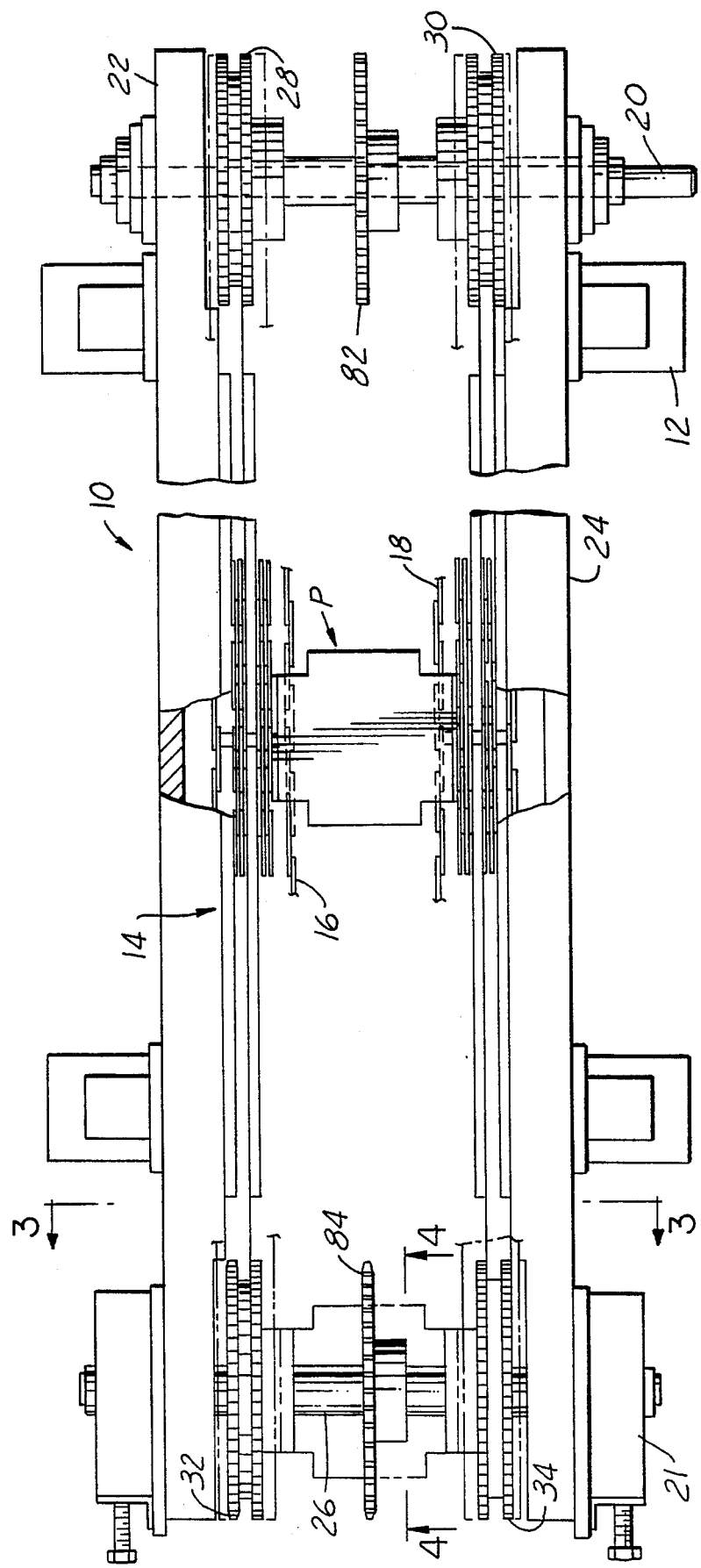
FIG. 1 is a top view of apparatus constructed according to the invention.
Figure 2:
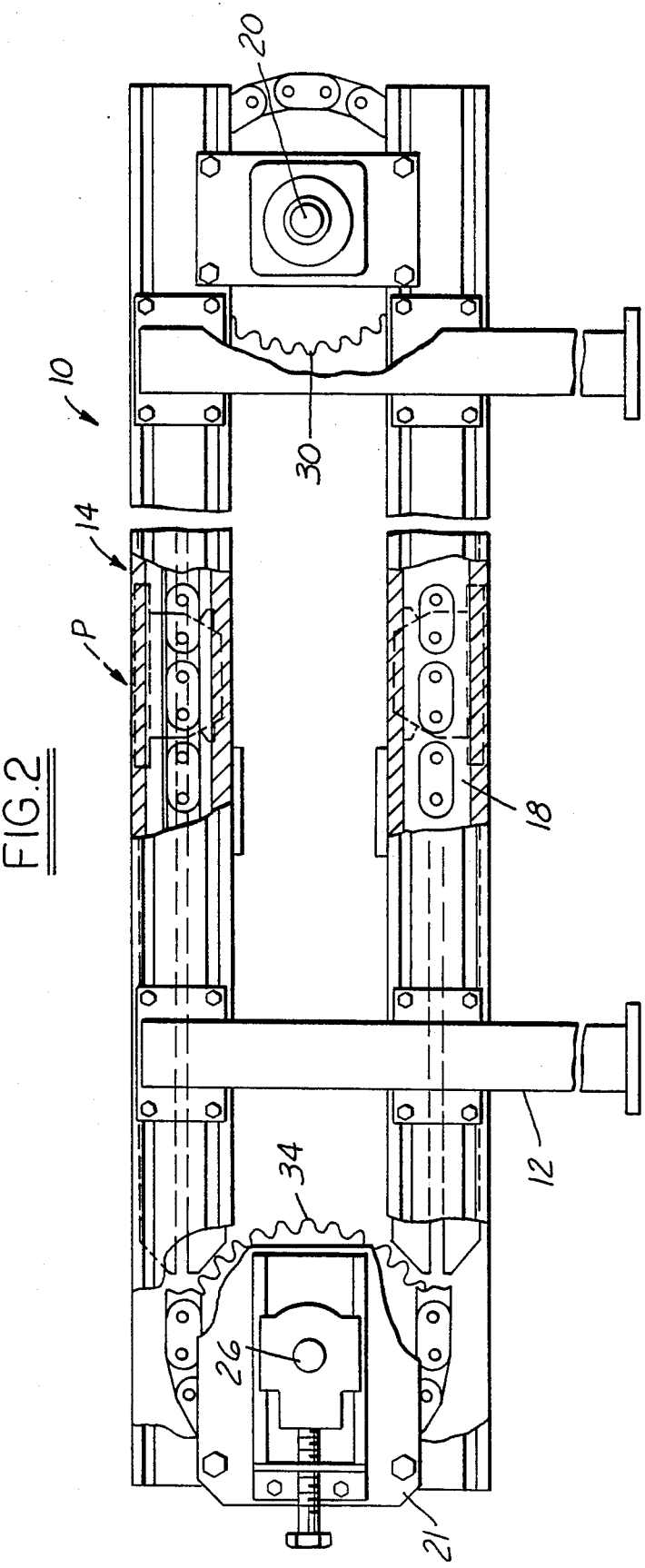
FIG. 2 is a side view, with parts in section, of the apparatus shown in FIG. 1.

Referring now more particularly to the drawings and especially FIG. 1-6 thereof, the numeral 10 designates conveyor apparatus having a frame 12 supporting an endless accumulating conveyor 14.

The conveyor 14 comprises a pair of laterally spaced apart endless 3-strand roller chains 16 and 18. A transverse horizontal shaft 20 adjacent one end of the frame 12 is journaled for rotation in the sides 22 and 24 of the frame. A transverse horizontal shaft 26 adjacent the opposite end of the frame is spaced from and parallel to the shaft 20 and is journaled for rotation in a chain tensioning device 21 of conventional construction mounted on the sides 22 and 24 of the frame.

Sprockets 28 and 30 are keyed to the shaft 20 in laterally spaced apart relation to rotate with shaft 20. Sprockets 32 and 34 are keyed to the shaft 26 in laterally spaced apart relation to rotate with shaft 26.

Chain 16 extends over sprockets 28 and 32 with the sprocket teeth engaging between the rollers of the two outermost strands of the chain. The chain 16 has upper and lower runs 36 and 38 connected at their ends by curved sections extending around sprockets 28 and 32. Chain 18 extends over sprockets 30 and 34 with the sprocket teeth engaging between the rollers of the two outermost strands of the chain. The chain 18 has upper and lower runs 40 and 42 connected at their ends by curved sections extending around sprockets 30 and 34.

The upper runs 36 and 40 of the two chains are horizontal and parallel to one another, and are guided by horizontal guide rails 44, 46, 48 and 50. Rails 44–50 extend almost the full length of the upper runs, but terminate short of the sprockets at the ends of the runs. Rails 44 and 46 are carried by rail support 52 mounted on side 22 of the frame. Rails 48 and 50 are carried by rail support 54 mounted on side 24 of the frame.

Rails 44 and 48 are above the respective upper runs 36 and 40 and engage the outermost strands thereof. Rails 46 and 50 are below the respective upper runs 36 and 40 and engage the middle strands thereof.

The lower runs 38 and 42 of the chains are horizontal and parallel to one another, and are guided by horizontal guide rails 56, 58, 60 and 62. Rails 56–62 extend almost the full length of the lower runs, but terminate short of the sprockets at the ends of the runs. Rails 56 and 58 are carried by rail support 64 mounted on side 22 of the frame. Rails 60 and 62 are carried by rail support 66 mounted on side 24 of the frame.

Rails 56 and 60 are above the respective lower runs 38 and 42 and engage the outermost strands thereof. Rails 58 and 62 are below the respective lower runs 38 and 42 and engage the middle strands thereof.

The conveyor 14 is designed to slidably support and locate pallets P and to transport them over both the upper and lower runs 36 and 38. Pallets P are article carriers and have shoes 72 and 74 secured to the under side thereof. Each shoe has a support 76 which carries two vertically spaced apart guide bars 78 and 80. The guide bars 78 and 80 of each shoe are parallel to one another and extend lengthwise of the pallet. Guide bars 80 have tapered surfaces 81 at the ends.

When a pallet is supported on the upper runs of the conveyor, the top guide bars 78 ride on the rollers of the innermost strands of the two chains. When the pallet is supported on the lower runs, the pallet is inverted and guide bars 80 ride on the rollers of the innermost strands of the two chains.

Means are provided for positively propelling pallets around the curved sections of the chains extending over the sprockets at both ends of the conveyor. Such means includes a sprocket 82 keyed to shaft 20 midway between sprockets 28 and 30, a sprocket 84 keyed to shaft 26 midway between sprockets 32 and 34, and a dog on the underside of each pallet in the form of a spring-loaded pin 85.

Figure 4:
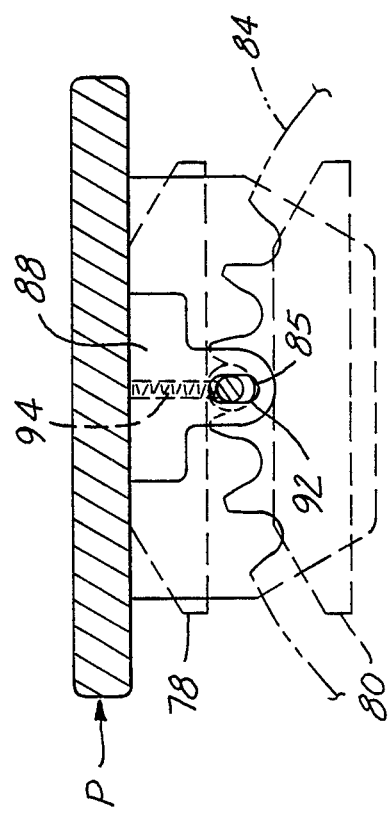
FIG. 4 is a fragmentary sectional view taken on the line 4—4 in FIG. 1.
Figure 3:
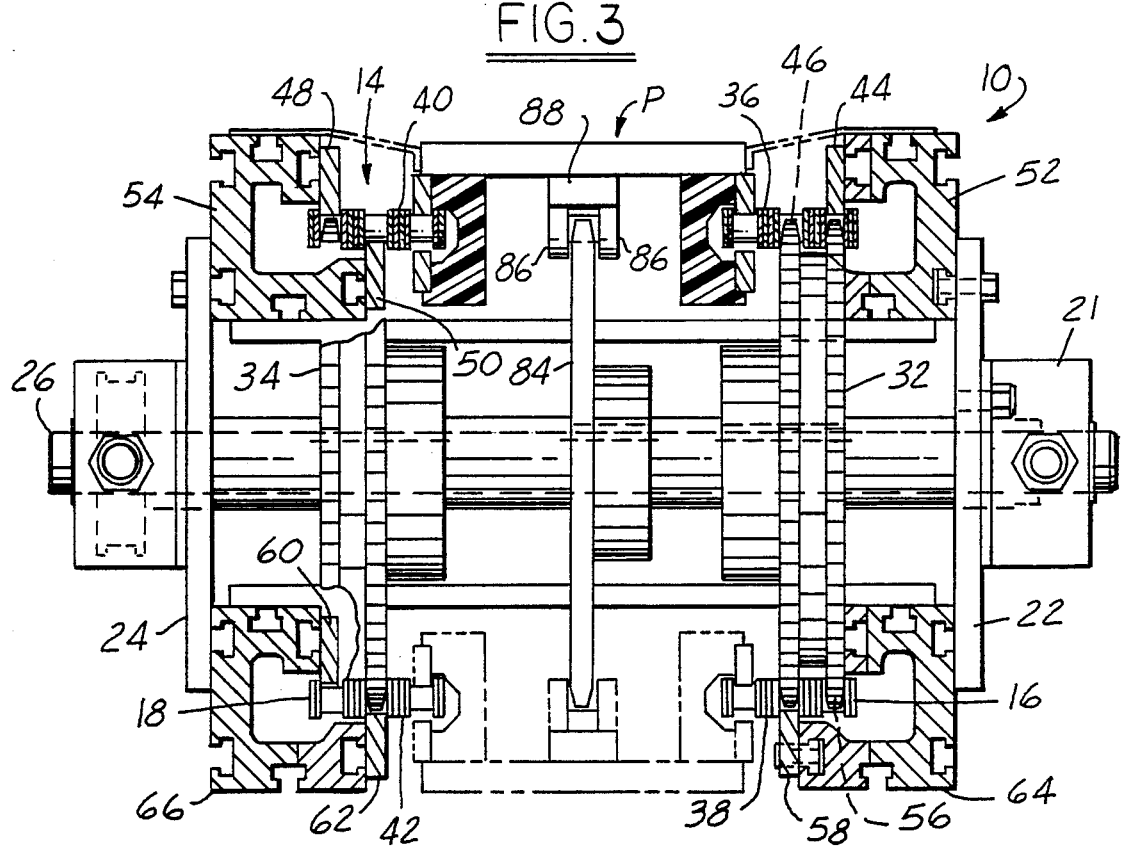
FIG. 3 is a sectional view taken on the line 3—3 in FIG. 1.
Figure 5:
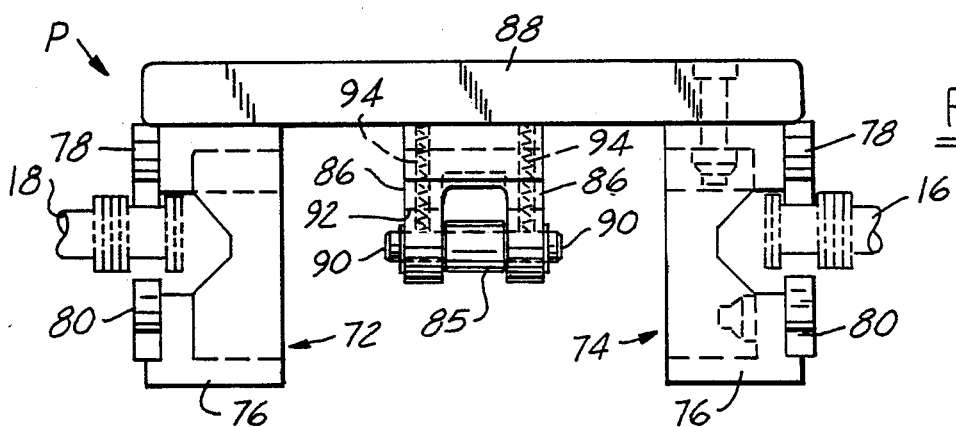
FIG. 5 is an end view of a pallet adapted to be transported by the conveyor.
Figure 6:
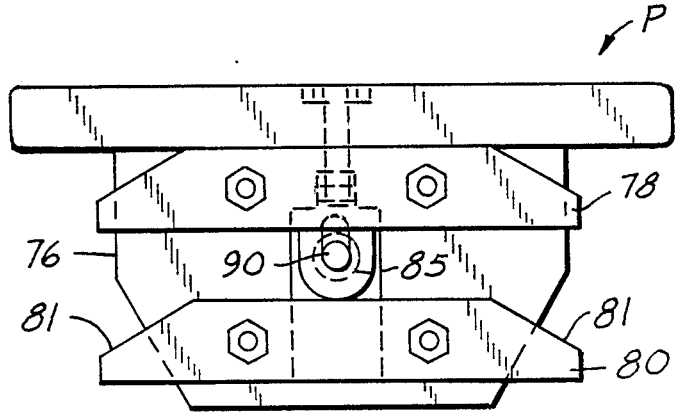
FIG. 6 is a side view of the pallet shown in FIG. 5.

As seen in FIGS. 3–5, the pin 85 extends across the space between the arms 86 of a clevis 88. The pin has reduced ends 90 which are slidably received in vertically elongated slots 92 in the clevis arms 86. The clevis 88 is secured to the underside of each pallet midway between the sides of the pallet, and is oriented so that the pin 85 extends transversely of the pallet. The clevis arms 86 are bored to receive compression coil springs 94 which press on the ends of the pin 85, urging them to the lower ends of the slots 92. In this position of pin 85, it will engage in the space between any two successive teeth on sprocket 82 or sprocket 84 so that the pallet will be positively propelled by the sprocket around the curved sections of the chains 16 and 18 from the upper runs to the lower runs or vice versa. The pin 85 is spring-loaded so that it can slide over a tooth on one of the sprockets 82, 84 before dropping into a space between the sprocket teeth.

The guide bars 78 and 80 are spaced far enough apart and guide bars 80 have tapered ends 81 to permit the pallets to move freely around the sprockets 28–34 at both ends of the conveyor without the guide bars binding on the curved sections of the chains. However, the guide bars retain the pallets in positions such that pins 85 will remain engaged with sprockets 82 and 84.

In operation, the conveyor is continuously driven by a suitable power source (not shown) connected to one of the shafts 20, 26. Pallets on the upper and/or lower runs will be advanced due to frictional contact between the pallet guide bars 78 or 80 and the chain rollers, or the pallets may be accumulated and held stationary by suitable stops (not shown) at selected locations along either run of the conveyor while the conveyor continues to advance. If the pallets are allowed to advance with the conveyor, without accumulating, they will be positively propelled around the end sprockets from one conveyor run to the other.

Figure 7:
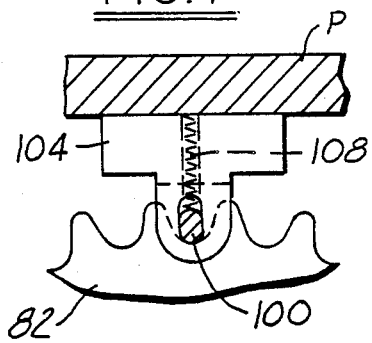
FIG. 7 is a side view, similar to FIG. 4, showing a modification.
Figure 8:
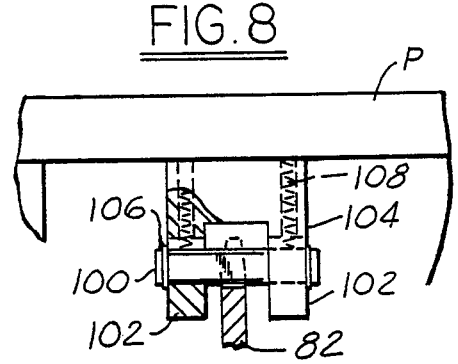
FIG. 8 is an end view of the structure of FIG. 7, with parts in section.

In the foregoing description, the means on the pallet for engaging sprocket 82 or 84 is a spring-loaded pin. Other means may be employed. FIGS. 7 and 8 show a modification in which a thin flat blade 100 is employed instead of the pin 85. The blade 100 operates in substantially the same way as the pin. The blade 100 extends across the space between the arms 102 of a clevis 104 secured on the bottom of each pallet. The ends of the blade are slidably received in vertically elongated slots 106 in the clevis arms 102. The clevis 104 is secured to the underside of each pallet midway between the sides of the pallet, and is oriented so that the blade 100 extends transversely of the pallet. The clevis arms 102 are bored to receive compression coil springs 108 which press on the ends of the blade, urging the blade to the lower ends of the slots 106. In this position of the blade, it will engage in the space between any two successive teeth on the sprocket 82 or 84, in the same manner as the pin 85.

Figure 9:
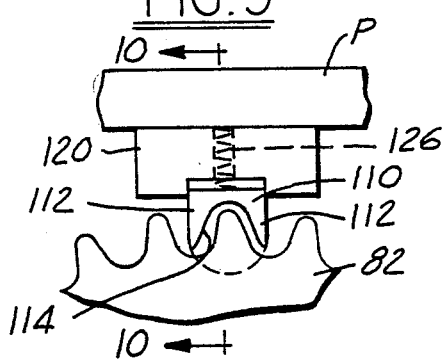
FIG. 9 is a side view showing a second modification.
Figure 10:
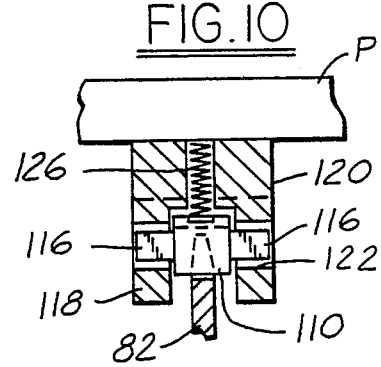
FIG. 10 is a sectional view taken on the line 10—10 in FIG. 9.

FIGS. 9 and 10 show a further modification in which, instead of a pin like pin 85 or a blade like blade 100, a gear segment 110 is employed. The gear segment 110 has two teeth 112 with a space 114 between the teeth. The gear segment has reduced end extensions 116. The gear segment is disposed in the space between the arms 118 of a clevis 120. The extensions 116 are slidably received in vertically elongated slots 122 in the clevis arms 118. The clevis 120 is secured to the underside of each pallet midway between the sides of the pallet and is oriented so that the gear segment is in a position such that the space between the teeth 112 can receive a tooth on one of the sprockets 82, 84. The clevis arms are bored to receive compression coil springs 126 which press on the extensions 116 of the gear segment, urging them to the lower ends of the slots 122. In this position of the gear segment, it will engage with the sprocket teeth in the manner indicated in the drawings.

Figure 11:
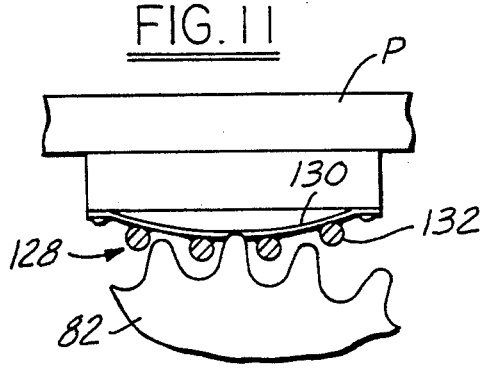
FIG. 11 is a side view showing a third modification.
Figure 12:
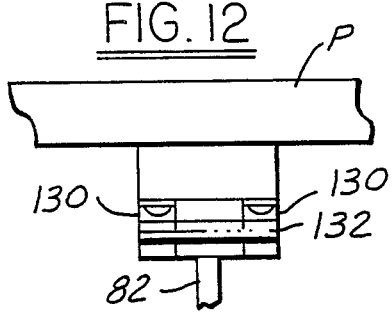
FIG. 12 is an end view of the structure of FIG. 11.

A further modification is shown in FIGS. 11 and 12 in which, instead of a pin or blade or gear segment, the part on the pallet engageable with the sprocket 82 or 84 is a resilient chain segment 128. The chain segment may be composed of a pair of laterally spaced resilient flexible bands 130, with transverse chain elements 132 extending transversely between the bands and spaced from one another in the direction of band length. The chain segment 128 extends lengthwise beneath each pallet, with the ends of the bands secured to the pallet. The chain elements 132 are spaced apart a distance corresponding to the spacing of the teeth on the sprockets 82, 84, so that the chain elements 132 will fit neatly into the spaces between the sprocket teeth as shown in FIG. 11, and the pallet will be positively propelled around the curved end section of the conveyor.

Figure 13:
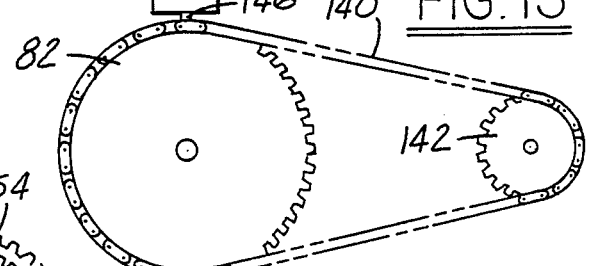
FIG. 13 is a side view showing a fourth modification.
Figure 15:
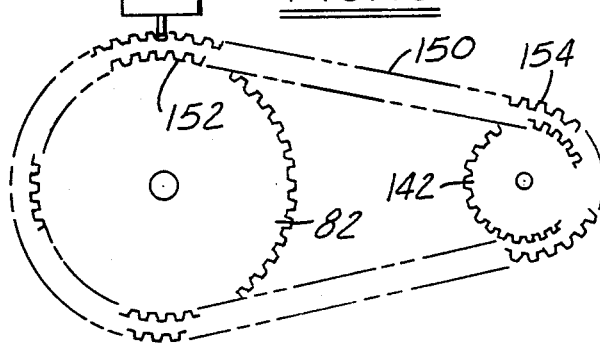
FIG. 15 is a side view showing a fifth modification.
Figure 14:
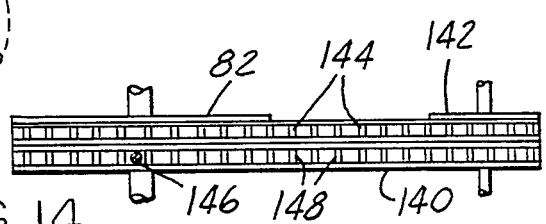
FIG. 14 shows the structure of FIG. 13 as viewed from above.

FIGS. 13 and 14 show a still further modification. The same driven sprocket 82, 84 is used at each end of the conveyor. An endless flexible linear member 140 is trained over the driven sprocket at each end of the conveyor and also over a free-turning sprocket 142 of smaller diameter, spaced from that sprocket in a direction toward the other end of the conveyor. The flexible linear member 140 may be a double or triple strand roller chain, one strand of which is trained over the sprocket with the rollers 144 of such one strand engaging in the spaces between the teeth of the sprocket. A fixed projection 146, such as a pin or blade, is secured to and extends beneath the pallet and is adapted to engage in the spaces or recesses between the rollers 148 of another strand of the chain. The chain preferably has some slack in the upper run to facilitate engagement of the projection with the chain, after which the pallet is positively propelled around the curved section at the end of the conveyor. The flexible member, instead of being a roller chain, may, as shown in FIG. 15, be a cogged belt 150 with cogs 152 on one side to engage in the spaces between the sprocket teeth and cogs 154 on the other side to provide spaces between the cogs for receiving the projection 146 on the pallet.

Figure 16:
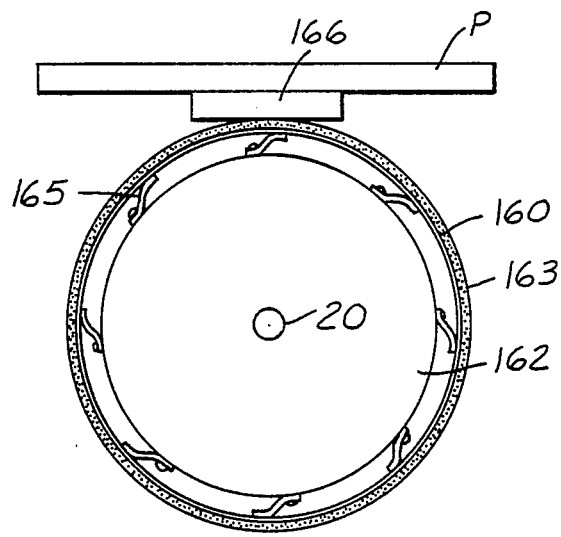
FIG. 16 is a side view showing a sixth modification.

FIG. 16 shows a further modification in which the sprockets 82 and 84 at the ends of the conveyor are replaced by free-floating friction rings 160. Each friction ring is mounted on a supporting center disc 162 keyed to one of the transverse shafts 20, 26 of the conveyor. The ring 160 has anti-slip or friction material 163 on its outer surface. In the space between the ring 160 and the disc 162 are spring elements 165 or the like to provide a resilient compressible, floating mount for the ring. The pallets are each provided on the bottom with a block 166 adapted to engage the friction material 163 on ring 160 and be positively propelled around the curved section at the end of the conveyor by means of this frictional engagement. The floating design of the friction ring enables the block to yieldably contact the friction ring with sufficient pressure to propel the pallets without slipping.

Figure 17:
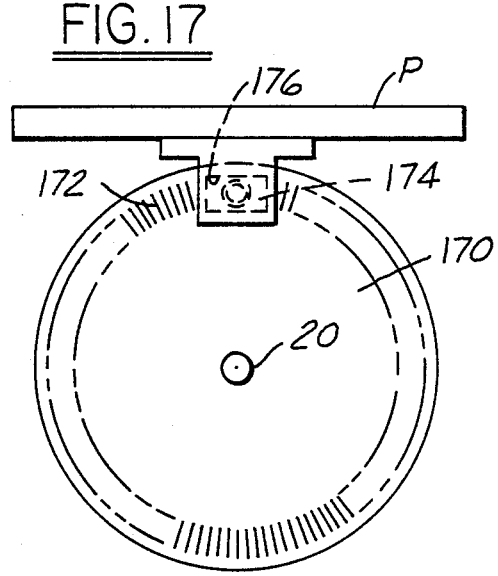
FIG. 17 is a side view showing a seventh modification.
Figure 18:
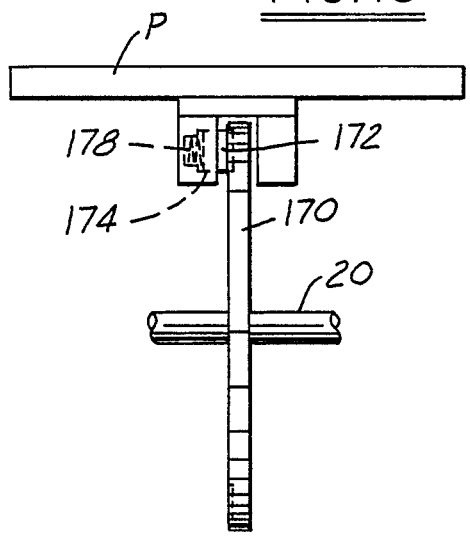
FIG. 18 is an end view of the structure of FIG. 17.

FIGS. 17 and 18 show a further alternative construction in which the sprockets 82 and 84 at the ends of the conveyor are replaced by discs 170 keyed to the shafts 20 and 26. Each disc is provided on one side with radial serrations or grooves defining a circumferential series of radial projections or teeth 172. On the underside of each pallet, there is a block 174 slidably mounted in a guide 176 on the pallet and biased by springs 178 to move horizontally and transversely with respect to the path of pallet movement into a position for yielding pressure contact with the serrated or grooved surface on the side of the disc 170. The face of the block engaging the disc may be similarly grooved or serrated to complement the grooved or serrated configuration of the disc for more positive contact. The pallet will be positively propelled around the curved end section of the conveyor by means of the yielding pressure of engagement of the block 174 with the serrated or grooved surface of the disc 170.

Figure 19:
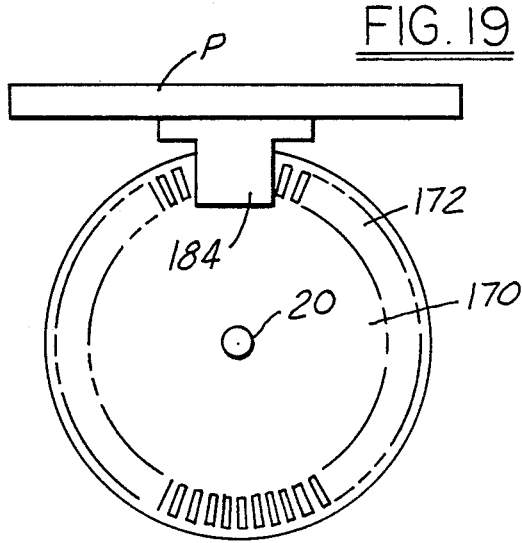
FIG. 19 is a side view of an eighth modification.
Figure 20:
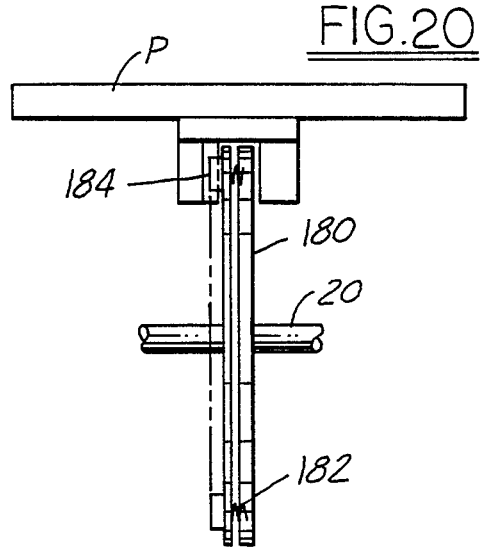
FIG. 20 is an end view of the structure of FIG. 19.

FIG. 19 and 20 a further modification in which the disc 170 is mounted on a supporting disc 180, which latter is keyed to one of the shafts 20, 26 of the conveyor. The disc 170 is mounted on disc 180 in a manner permitting movement of disc 170 axially toward and away from disc 180. A compressible spring unit 182 is confined in the space between the two discs. A block 184 fixedly secured to the underside of each pallet engages the serrated or grooved surface 172 of the disc 170 so that the pallet may be positively propelled around the curved end of the conveyor. The yielding support of the disc 170 enables it to engage the block 184 under sufficient pressure to avoid slipping. The face of the block 184 which engages the surface of the disc 170 may, if desired, have a complementary surface configuration to that of disc 170 to improve the driving contact between the two.

I claim:

1. An endless accumulating conveyor comprising laterally spaced apart endless, flexible linear members having upper and lower runs connected at the ends of said conveyor by curved suctions thereof, pallets slidably supported on said linear members and adapted to be frictionally transported thereby over said upper and lower runs, and mechanism for positively propelling said pallets over at least one of said curved sections from one of said runs to the other, said mechanism comprising a sprocket adjacent one end of said conveyor, means supporting said sprocket for rotation on an axis extending transversely of said conveyor, said sprocket having a plurality of spaced apart teeth along its periphery, a dog for each pallet, support means mounting each dog on a pallet for movement toward and away from a position engageable with said sprocket in the space between any two adjacent teeth thereof, spring means urging said dog towards said position engageable with said sprocket, and means for rotating said sprocket.

2. The conveyor defined in claim 1, wherein means are provided for retaining said pallets on said linear members in a predetermined orientation, and said dog for each pallet comprises a pin extending generally parallel to said axis of rotation of said sprocket when said pallet is oriented as aforesaid.

3. The conveyor defined in claim 2, wherein said support means for each pin comprises a clevis having laterally spaced arms slidably supporting the ends of said pin, and said spring means comprises springs in said clevis arms bearing on said ends of said pin, the portion of said pin between said clevis arms being engageable with said sprockets as aforesaid.

4. An endless accumulating conveyor comprising laterally spaced apart endless multi-strand conveyor chains having upper and lower runs connected at the ends of said conveyor by curved sections thereof, laterally spaced, coaxial conveyor sprockets at each end of said conveyor for supporting said curved sections of said chains, means supporting said conveyor sprockets for rotation on axes extending transversely of said conveyor, pallets slidably supported on said chains and adapted to be frictionally transported thereby over said upper and lower runs, means for retaining said pallets on said chains in a predetermined orientation comprising a pair of shoes on each pallet, one of said shoes having vertically spaced upper and lower guide bars respectively above and below one of said chains and the other of said shoes having upper and lower guide bars respectively above and below the other of said chains, said guide bars of one shoe of each pallet being guided by one strand of one of said chains and said guide bars of the other shoe of each pallet being guided by one strand of the other of said chains, said conveyor sprockets engaging other strands of said chains, said guide bars of each shoe being constructed and arranged to permit said pallets to move around said curved sections without binding, and mechanism for positively propelling said pallets over at least one of said curved sections from one of said runs to the other, said mechanism comprising a propelling sprocket between and coaxial with said conveyor sprockets which support one of said curved sections of said chains, said propelling sprocket having a plurality of spaced apart teeth along its periphery, a pin for each pallet extending generally parallel to said axis when said pallet is oriented as aforesaid, support means mounting each pin on a pallet for movement toward and away from a position engageable with said sprocket in the space between any two adjacent teeth thereof, spring means urging said pin towards said position engageable with said sprocket, and means for rotating all of said sprockets.

5. The conveyor defined in claim 4, wherein said support means for each pin comprises a clevis having laterally spaced arms slidably supporting the ends of said pin, and said spring means comprises springs in said clevis arms bearing on said ends of said pin, the portion of said pin between said clevis arms being engageable with said sprocket as aforesaid.

6. A conveyor as claimed in claim 1, wherein said driven member is a sprocket having a plurality of spaced apart teeth along its periphery to define said propelling means, and said part on each pallet is a blade engageable in the space between any two adjacent teeth.

* * * * *

UNITED STATES PATENT AND TRADEMARK OFFICE
CERTIFICATE OF CORRECTION

PATENT NO. : 4,934,515
DATED : June 19, 1990
INVENTOR(S) : ENDLESS ACCUMULATING CONVEYOR It is certified that error appears in the above-identified patent and that said Letters Patent is hereby corrected as shown below:

Column 5, line 42, "suctions" should be -- sections --

Signed and Sealed this

Third Day of September, 1991

*Attest:*

HARRY F. MANBECK, JR.

*Attesting Officer*     *Commissioner of Patents and Trademarks*